US007710317B2

United States Patent
Cheng et al.

(10) Patent No.: US 7,710,317 B2
(45) Date of Patent: May 4, 2010

(54) METHOD FOR GPS POSITIONING IN A WEAK SIGNAL ENVIRONMENT

(75) Inventors: MingQiang Cheng, Chengdu (CN); Cheng Li, Chengdu (CN); Bo Yu, Chengdu (CN); ShiJie Li, Chengdu (CN); Xiquan Yang, Chengdu (CN); Yi Zeng, Chengdu (CN)

(73) Assignee: O2Micro International Ltd., Georgetown (KY)

( * ) Notice: Subject to any disclaimer, the term of this patent is extended or adjusted under 35 U.S.C. 154(b) by 1006 days.

(21) Appl. No.: 11/347,498

(22) Filed: Feb. 3, 2006

(65) Prior Publication Data
US 2007/0183486 A1 Aug. 9, 2007

(51) Int. Cl.
G01S 1/00 (2006.01)
G01S 1/02 (2006.01)
(52) U.S. Cl. .............................. 342/357.15; 342/357.12
(58) Field of Classification Search ................. 342/356, 342/357.06, 357.12, 357.15; 701/213, 215; 375/150, 152
See application file for complete search history.

(56) References Cited

U.S. PATENT DOCUMENTS 4,445,118 A * 4/1984 Taylor et al. ............ 342/357.09
5,402,347 A * 3/1995 McBurney et al. .......... 701/213
2005/0114023 A1* 5/2005 Williamson et al. ......... 701/214

FOREIGN PATENT DOCUMENTS

CN 1338614 A 3/2002
CN 1349108 A 5/2002

* cited by examiner

Primary Examiner—Dao L Phan
(74) Attorney, Agent, or Firm—Wang Law Firm, Inc.; Li K. Wang (57) ABSTRACT

The present invention is a method for GPS positioning in a weak signal environment. The method includes obtaining assistance data for a GPS signal from a satellite at a predetermined time, wherein the assistance data including predicted navigation data, Doppler shift and Doppler shift rate and the GPS signal being modulated by a carrier signal, a pseudorandom code and navigation data, estimating a predicted receiving time for the GPS signal reaching the GPS receiver, capturing the GPS signal, converting the GPS signal to an intermediate frequency signal, acquiring a code phase of the pseudorandom code from the intermediate frequency signal by using the assistance data and the predicted receiving time, and obtaining a position for the GPS receiver based on the predicted navigation data and the code phase of the pseudorandom code. To acquire the code phase of the pseudorandom code, the GPS receiver corrects a real time clock to one millisecond accuracy and process the intermediate frequency signal through coherent correlation of one second.

25 Claims, 6 Drawing Sheets

METHOD FOR GPS POSITIONING IN A WEAK SIGNAL ENVIRONMENT

FIELD OF THE INVENTION

The present invention relates to radio signal processing, and more particularly to radio signal processing in a weak signal environment.

BACKGROUND OF THE INVENTION

A Global Positioning System (GPS) is a satellite-based navigation system. There are two carrier frequencies commonly used by satellites, one is at 1575.42 MHz, the L1 channel, and other is at 1227.6 MHz, the L2 channel. Most commercial receivers only use the L1 channel. There are also two pseudorandom noise (PRN) codes used, the precise or protected (P) code and the course acquisition (C/A) code. The P code is classified and only used by military receivers. The C/A code is a sequence of zeros and ones and is unique for each satellite. Each zero or one is known as a "chip". The C/A code is 1023 chips long, and it is broadcasted at 1.023 Megachips per second, i.e., the duration of the C/A code lasts one millisecond. Thus, it should be appreciated by those skilled in the art that the word "chip" may be regarded as a measurement unit of a data length or a time length. The property of C/A codes is that they have the best cross-correlation characteristic. The cross-correlation between any two C/A codes is much lower than auto-correlation of each C/A code individually. The C/A code is public and used by all receivers. Navigation data are also a sequence of zeros and ones at a rate of 50 bits per second, which carry satellite orbital position information. The navigation data and the C/A code are modulated by the carrier signal to form a GPS signal.

A GPS receiver can generate position coordinates by extracting and decoding the navigation data in GPS signals. A set of data collected by the GPS receiver usually contain GPS signals from several satellites. GPS signals from different satellites travel through different channels and are shifted in frequency due to the relative receiver-satellite motion. This is the so-called Doppler shift. Usually, each GPS signal has a different C/A code with a different code phase and a different Doppler shift, and the GPS receiver simultaneously processes the GPS signals from several channels. The code phase as used herein indicates a beginning point of the C/A code. Since the exact Doppler shift is unknown, a possible range of the Doppler frequencies should be searched. Also, to identify visible satellites, all possible C/A codes which are unique to each satellite should be searched. Therefore, to acquire the GPS signals from the visible satellites, the GPS receiver traditionally conducts a two dimensional search process for each received GPS signal, checking each C/A code with every possible code phase on every possible Doppler frequency. The acquired GPS signals may then be used to generate the position coordinates.

Figure 1:
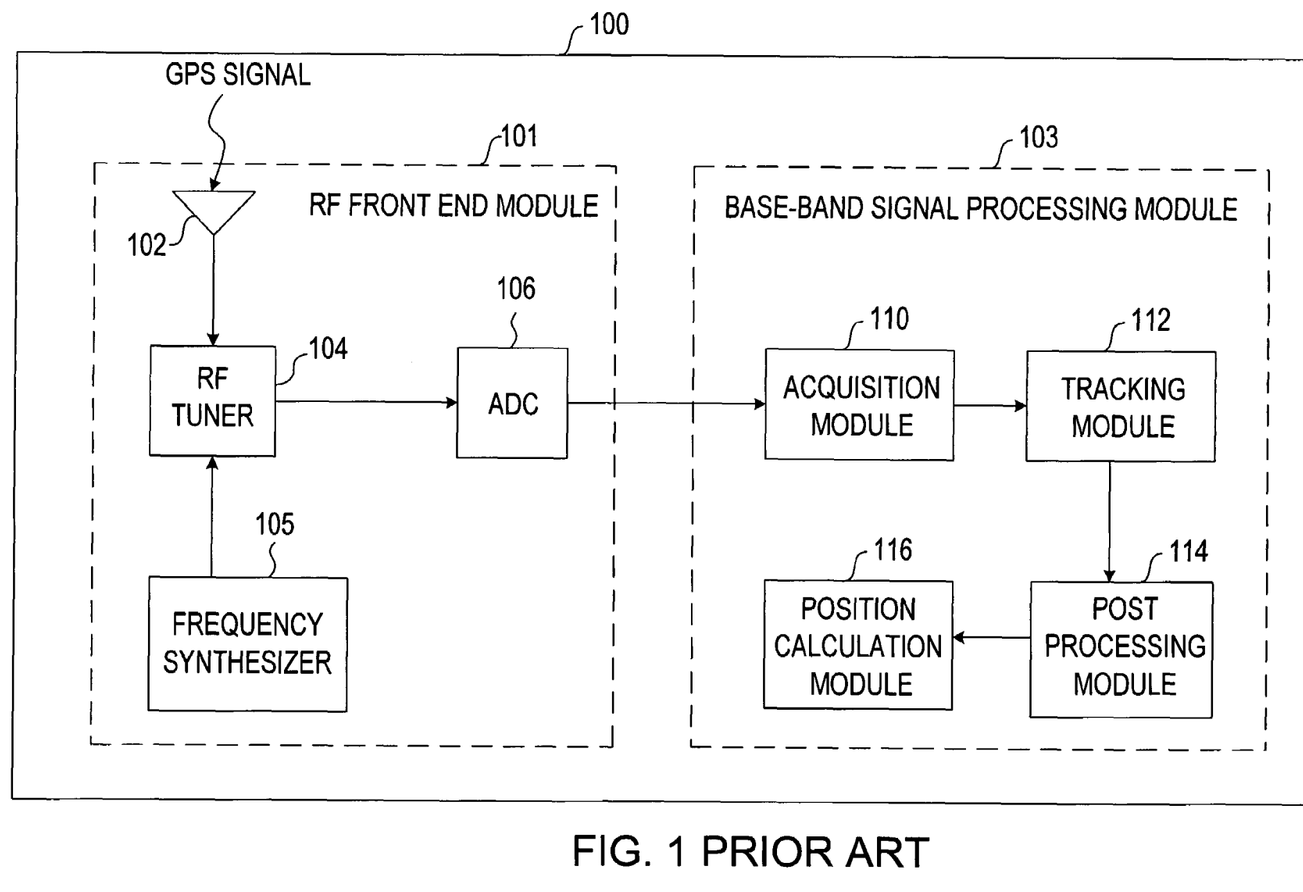
FIG. 1 is a prior art block diagram of a GPS receiver.

FIG. 1 illustrates a prior art block diagram of a GPS receiver 100. In general, the GPS receiver 100 includes a radio frequency (RF) front end module 101 and a base-band signal processing module 103. A GPS signal from a satellite is received by an antenna 102. Through a RF tuner 104 and a frequency synthesizer 105, the GPS signal is converted from a radio frequency signal to a signal with a desired output frequency. Then, an analog-to-digital converter (ADC) 106 digitizes the converted signal at a predetermined sampling frequency. The digitized signal is an intermediate frequency (IF) signal. The IF signal is then sent to the base-band signal processing module 103.

The base-band signal processing module 103 extracts navigation data from the IF signal and then calculates the location of the GPS receiver 100 based on the navigation data. In order to extract the navigation data, it is necessary to remove the carrier signal and the C/A code through an acquisition module 110 and a tracking module 112. The GPS signal is acquired by correlation in the acquisition module 110. The correlation is implemented by multiplying the IF signal with a local C/A code and a local carrier signal to obtain a product and then integrating the product over the GPS signal duration to obtain a correlation result. To acquire the GPS signal, the acquisition module 110 repeats the correlation on a two dimensional space by changing a code phase of the local C/A code and a Doppler frequency of the local carrier signal until the correlation result reaches a peak value. Once the GPS signal is acquired, the C/A code phase and the Doppler frequency are coarsely estimated and passed to the tracking module 112 for the tracking initialization. The tracking module 112 then removes the carrier signal and the C/A code in the GPS signal by adjusting itself to match the carrier signal and the C/A code. Information such as the navigation data is obtained at the tracking module 112. The GPS receiver 100 then decodes the navigation data to obtain satellite orbital position information through a post processing module 114, and the satellite orbital position information is then passed to a position calculation module 116 for calculation of the GPS receiver's position.

Ideal scenario for applications of such conventional GPS receivers is a clear view of sky so that line-of-sight GPS signals can reach the GPS antenna. However, due to the widespread interest in GPS technology, many applications require the GPS receivers to realize fast and precise positioning in some environments such as indoors and downtown, where GPS signals are greatly weakened and attenuated. In this situation, an assisted-GPS (AGPS) approach is implemented to improve the ability of GPS receivers in such environments.

Figure 2:
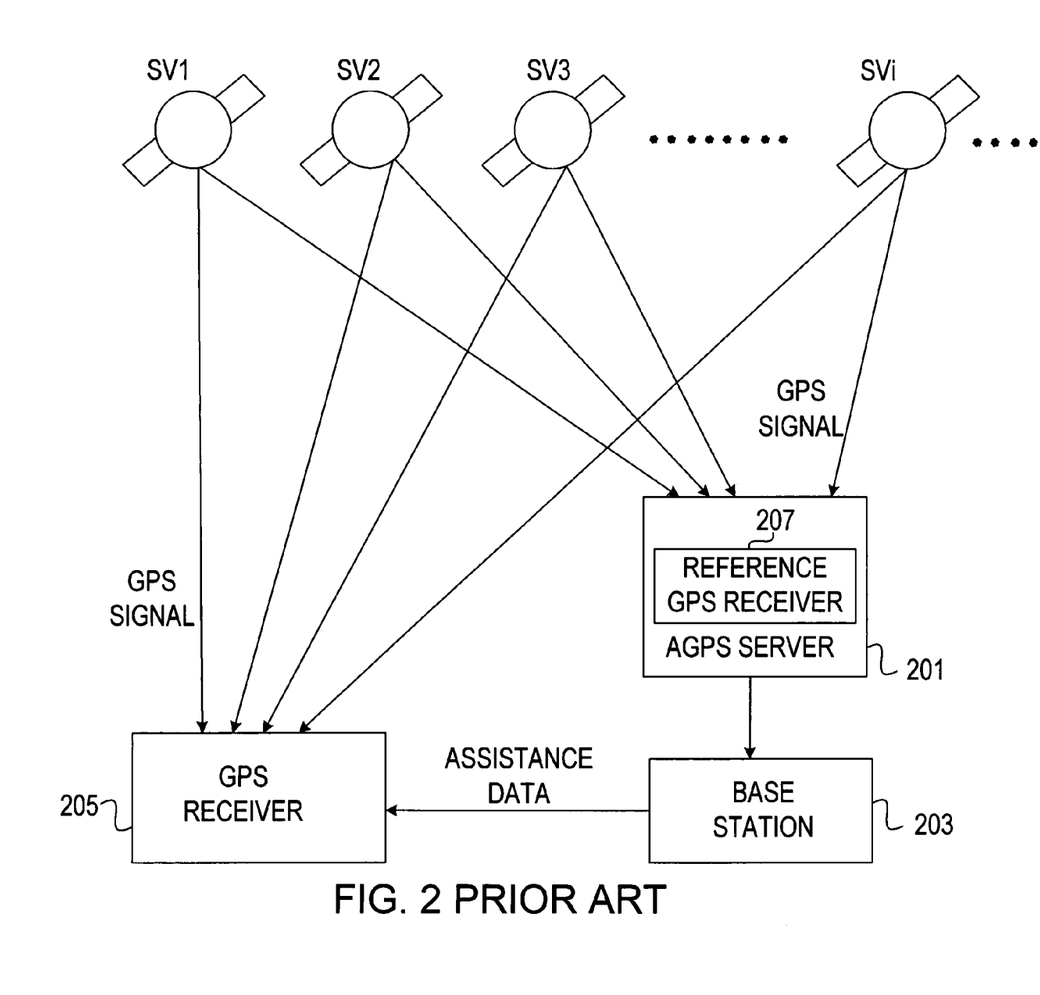
FIG. 2 is a prior art architecture of an AGPS.

FIG. 2 illustrates a prior art architecture of an AGPS. The exemplary AGPS architecture includes an AGPS server 201 with a reference receiver 207 which has line-of-sight views of available satellites. The reference receiver 207 continuously tracks the available satellites and logs satellite tracking information, such as satellite almanac, ephemeris, approximate user position and a time stamp. The AGPS server 201 collects the satellite tracking information from the reference receiver 207. The satellite tracking information makes it possible to predict satellite orbit and clock information for many days into the future. So the AGPS sever 201 generates assistance data for acquisition and track of incoming GPS signals and sends the assistance data to a base station 203. The base station 203 transmits the assistance data to a GPS receiver 205. The GPS receiver 205 may significantly improves time-to-first-fix and sensitivity by using the assistance data.

Despite the advantages offered by the assistance data, use of conventional approaches for GPS signal acquisition in a conventional GPS receiver does not adequately address the indoors and downtown challenge. Conventionally, due to the navigation data bits, which have a phase transition in 20 ms, the GPS signal acquisition module coherently correlates blocks of GPS signal spanning anywhere from 1 to 20 millisecond in duration. The results are then combined non-coherently, that is, the squares or magnitudes of block correlation functions are summed. This non-coherent combination results in "squaring loss," reducing sensitivity. Therefore, the GPS receiver requires substantial improvements in sensitivity in the indoors and downtown environments. Thus, it is desirous to have an apparatus and method that significantly enhances the sensitivity of the GPS receiver and it is to such apparatus and method the present invention is primarily directed.

SUMMARY OF THE INVENTION

In one embodiment, there is provided a method for processing a global positioning system (GPS) signal at a GPS receiver. The method includes the steps of: a) converting the GPS signal to an intermediate frequency (IF) signal, wherein the GPS signal being modulated by a carrier signal, a pseudorandom code and navigation data; b) obtaining predicted navigation data for the GPS signal; c) generating a local carrier signal and a local pseudorandom code; and d) correlating the IF signal with the predicted navigation data, the local carrier signal and the local pseudorandom code.

In another embodiment, there is provided a method for synchronizing a GPS receiver with a satellite. The method includes the steps of: a) obtaining assistance data for a GPS signal received from the satellite at a predetermined time, wherein the assistance data including predicted navigation data, Doppler shift and Doppler shift rate and the GPS signal being modulated by a carrier signal, a pseudorandom code and navigation data; b) estimating a predicted receiving time for the GPS signal reaching the GPS receiver; c) capturing the GPS signal through channels of the GPS receiver; d) acquiring the GPS signal at each channel by using the assistance data to obtain a local receiving time for the GPS signal, wherein the GPS signal at each channel has a starting point and a predetermined search period; and e) correcting a real-time clock of the GPS receiver based on the local receiving time and the predicted receiving time.

In yet another embodiment, there is provided a method for positioning of a GPS receiver in a weak signal environment. The method includes the steps of: a) obtaining assistance data for a GPS signal from a satellite at a predetermined time, wherein the assistance data including predicted navigation data, Doppler shift and Doppler shift rate and the GPS signal being modulated by a carrier signal, a pseudorandom code and navigation data; b) estimating a predicted receiving time for the GPS signal reaching the GPS receiver; c) capturing the GPS signal; d) converting the GPS signal to an intermediate frequency signal; e) acquiring a code phase of the pseudorandom code from the intermediate frequency signal by using the assistance data and the predicted receiving time; and f) obtaining a position for the GPS receiver based on the predicted navigation data and the code phase of the pseudorandom code.

In yet another embodiment, there is provided a method for controlling a GPS receiver. The method includes the steps of: a) initiating the GPS receiver to a stand-alone mode; b) determining whether the GPS receiver succeeded to acquire GPS signals from at least four satellites; c) shifting the GPS receiver to a self-assisted mode if the GPS receiver failed to acquire the GPS signals from the at least four satellites; d) determining whether valid assistance data are stored in memory of the GPS receiver; and f) shifting the GPS receiver to an assisted-GPS mode if no valid assistance data are stored in the memory of the GPS receiver.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION OF THE INVENTION

Reference will now be made in detail to embodiments of the present invention. While the invention will be described in conjunction with the preferred embodiments, it will be understood that they are not intended to limit the invention to these embodiments.

Furthermore, in the following detailed description of the present invention, numerous specific details are set forth in order to provide a thorough understanding of the present invention. However, it will be recognized by one of ordinary skilled in the art that the present invention may be practiced without these specific details. In other instances, well known methods, procedures, components, and circuits have not been described in detail as not to unnecessarily obscure inventive aspects of the present invention.

Figure 3:
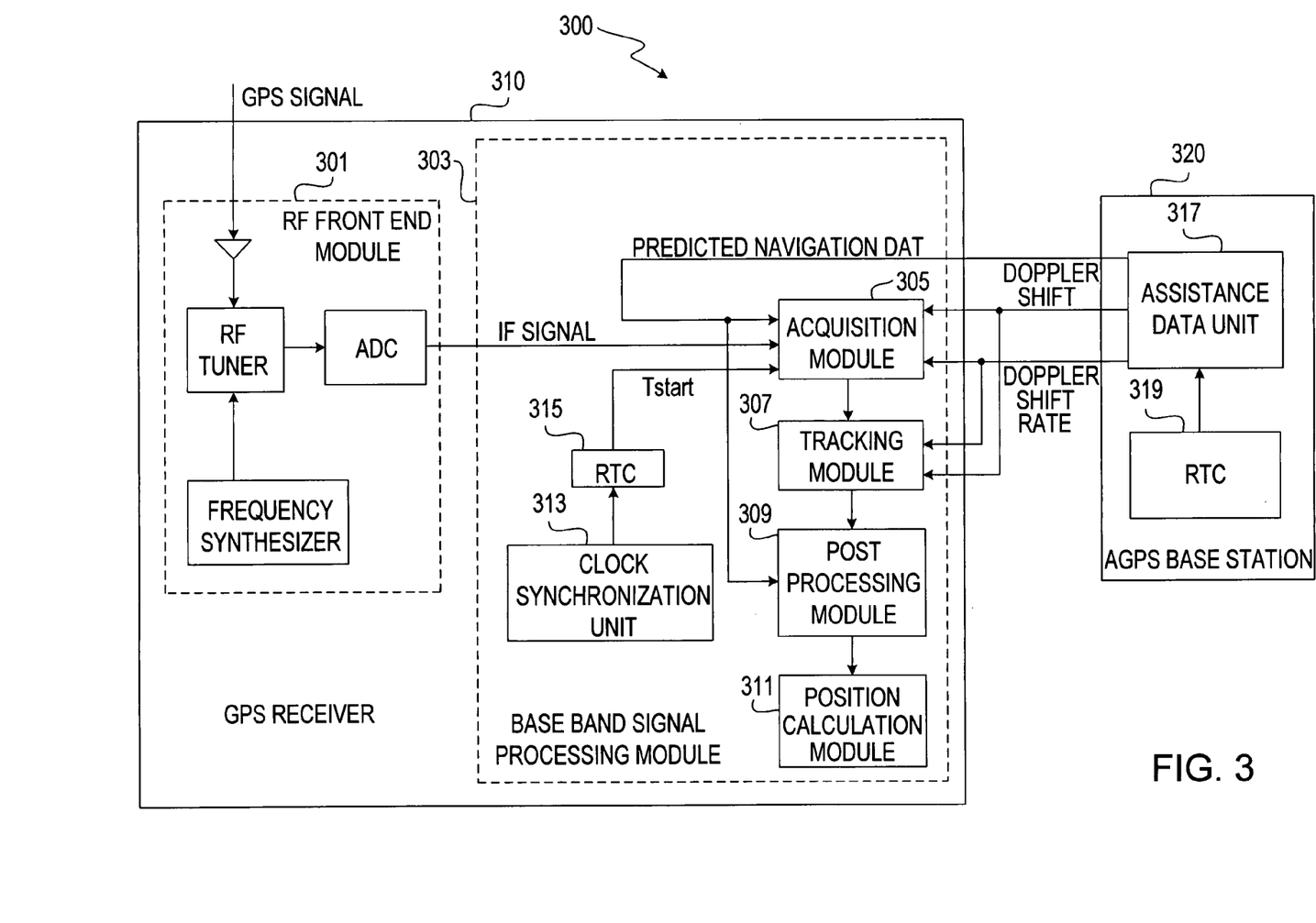
FIG. 3 is an exemplary block diagram of an AGPS.

FIG. 3 illustrates an exemplary block diagram of an AGPS 300. The AGPS 300 includes many components detailed earlier with respect to FIG. 2 where any repetitive description of those components is omitted herein for clarity. The AGPS 300 includes a GPS receiver 310 and an AGPS base station 320. An assistance data unit 317 of the AGPS base station 320 contains assistance data for a GPS signal received from a satellite at a predetermined time. Usually, when the GPS receiver 310 cannot acquire the GPS signal in a stand-alone mode, it will resort to the AGPS base station 320 for the assistance data. In the embodiment, Doppler shift, Doppler shift rate and predicted navigation data, are described herein as the assistance data for the purpose of interpreting improvements of the present invention over prior arts, and description of other assistance data is omitted herein for clarity. However, it should be appreciated by those skilled in the art that other assistance data are applicable to the present invention. The predicted navigation data are prediction of the navigation data in the GPS signal, and the Doppler shift and the Doppler shift rate are predicted data concerning the frequency of the carrier signal in the GPS signal. Since the assistance data are related to the GPS signal at the predetermined time, a real-time clock (RTC) 319 is connected to the assistance data unit 317 and provides time-related information for the assistance data. Furthermore, the AGPS base station 320 has to be synchronized with the satellite when using these time-related assistance data. The RTC 319 is used to synchronize the AGPS base station 320 with the satellite and provides an accurate timing reference for operation of the AGPS base station 320.

Since many components of the GPS receiver 310 are similar to those in FIG. 1, any description of these similar components will be omitted herein for clarity. Only the differences and improvements will be further described in detail. By using the assistance data, the GPS receiver 310 may enhance the sensibility dramatically. In the embodiment, the GPS receiver 310 works in an AGPS mode and the assistance data are provided by the AGPS base station 320. Since the assistance data are time-related, implementation of the assistance data at the GPS receiver should satisfy the timing requirements. So similar with the AGPS base station, the GPS receiver 310 should be also synchronized with the satellite prior to positioning operation.

A clock synchronization unit 313 and a real-time clock (RTC) 315 are used to achieve a timing reference with 1 ms accuracy. According to different environments, there may be different synchronization methods. For example, in a certain condition, no visible satellite can be identified at the GPS receiver 310 with a conventional acquisition method. In such condition, a new synchronization method is designed in the present invention. Assuming that the RTC 315 can provide the timing reference with one second accuracy against a GPS time of the satellite, the synchronization is implemented by using the assistance data following the steps below:

1. estimate a predicted receiving time for the GPS signal reaching the GPS receiver;
2. configure all channels, for example, eight channels of the GPS receiver 310 to detect the satellite;
3. set Doppler frequency of each channel with a 0.125 Hz difference consecutively, so a starting point and a search period of 125 ms are assigned to the GPS signal at each channel for a GPS signal acquisition;
4. capture the GPS signal at the eight channels simultaneously;
5. acquire the GPS signal by using the assistance data at each channel to obtain a local receiving time for the GPS signal; and
6. correct the local receiving time to the predicted receiving time at the RTC 315.

Among the above steps, the predicted receiving time in step 1 is equal to a starting time of transmission of the GPS signal plus an estimated transmission time for the GPS signal. The starting time of transmission can be decoded from the predicted navigation data, and the estimated transmission time is approximately equal to the time taken by the GPS signal transmitting from the satellite to the AGPS base station 320. The GPS signal is acquired at each channel by following the steps below:

1. convert the GPS signal to an intermediate frequency signal;
2. generate a local carrier signal and a local pseudorandom code;
3. align the starting point of the GPS signal with the predicted navigation data;
4. correlate the GPS signal with the predicted navigation data, the local carrier signal and the local pseudorandom code for one second to obtain a correlation result;
5. repeat step 4 for all possible Doppler frequencies of the local carrier signal and all possible code phases of the local pseudorandom code to search for a correlation peak from all correlation results;
6. offset the GPS signal 1 ms time interval against the predicted navigation data within the search period of 125 ms;
7. repeat the steps from step 4 to step 6 until the correlation peak is found;
8. track a code phase of the pseudorandom code in the GPS signal when the correlation peak is found; and
9. obtain the local receiving time for the GPS signal based on the code phase and an overall offset time of the GPS signal against the predicted navigation data.

For the correlation operation in step 4, coherent correlation of one second in time domain requires a frequency resolution of 1 Hz in frequency domain, so the Doppler frequency of the local carrier signal should be adjusted momentarily according to a equation 1):

$$f_{n+1} = f_n + k*t \qquad 1)$$

where $f_n$ is the Doppler shift, k is the Doppler shift rate, and $f_{n+1}$ is a next Doppler shift and t is a time interval between the Doppler shift and the next Doppler shift.

In the embodiment, specific numbers such as eight channels, one millisecond time interval and coherent correlation of one second, are described herein by way of illustration and not of limitation.

In another embodiment, if the GPS receiver operates in an ideal environment within last 2 hours before the predetermined time, it may generate the assistance data for the GPS signal at the predetermined time as the reference receiver 207 does in FIG. 2. Then using the generated assistance data, the GPS receiver may work in a self-assisted mode. The operation of the GPS receiver in the self-assisted mode is similar with that in the AGPS mode, so detailed description is omitted herein for clarity.

In another condition, there are one to three satellites visible. Another new synchronization method is designed in the present invention. The new synchronization method includes the following steps:

1. the AGPS base station 320 and the GPS receiver 310 receive a same frame of navigation data simultaneously;
2. the AGPS base station 320 and the GPS receiver 310 record time stamps for the same frame of navigation data, a first time stamp for the same frame of navigation data reaching the AGPS base station 320 and a second time stamp for the same frame of navigation data reaching the GPS receiver 310;
3. the AGPS base station 320 transmits the same frame of navigation data and the first time stamp to the GPS receiver 310;
4. the AGPS base station 320 corrects the RTC 319 based on the same frame of navigation data and the first time stamp; and
5. the GPS receiver 310 corrects the RTC 315 based on the same frame of navigation data and a clock difference between the first time stamp and the second time stamp.

In other conditions such as clear views of sky, at least four satellites are visible. Then no synchronization is needed prior to GPS positioning. With the stated synchronization methods, the GPS receiver 310 can provide the timing reference with one millisecond accuracy against the GPS time.

When completing the synchronization, the GPS receiver 310 may conduct positioning operation even in a weak signal environment by using the assistance data. A RF front end 301 captures the GPS signal from the satellite at the predetermined time and converts it to an IF signal. The IF signal is then sent to an acquisition module 305 of a base band signal processing module 303. Prior to the capture of the GPS signal, the assistance data have been obtained by the GPS receiver 310. As previously stated, the GPS receiver 310 can estimate a predicted receiving time for the GPS signal reaching the GPS receiver 310. So the RTC 315 starts a GPS signal acquisition process at a starting time $T_{start}$ by sending a Tstart signal to the acquisition module 305. The starting time $T_{start}$ is equal to a quotient of the predicted receiving time divided by 1 ms. A remainder of the predicted receiving time divided by 1 ms enhances timing accuracy to within 1 ms, which can be obtained by acquiring a code phase of the C/A code in the GPS signal through the acquisition module 305. Therefore, the main purpose of the acquisition module 305 is to find the code phase of the C/A code. Based on the starting time $T_{start}$ and the acquired C/A code phase, the GPS receiver 310 can determine an accurate receiving time for the GPS signal reaching the GPS receiver 310.

With the Doppler shift, the acquisition module 305 can search for the GPS signal over a predicted Doppler frequency range instead of over the possible range of the Doppler frequencies. Reducing the number of frequencies which should be searched to acquire the GPS signal reduces a time spent on the GPS signal acquisition process. The predicted navigation data provides another enhancement to detection of GPS signals. With the predicted navigation data, the navigation data in the GPS signal may be wiped off prior to the integration during the correlation operation and so the acquisition module 305 can coherently correlate the GPS signal for one second, which greatly improves the sensibility of the GPS receiver 310. To be wiped off, the navigation data should be aligned with the predicted navigation data when starting the coherent correlation. A starting time of the coherent correlation is controlled by the corrected RTC 325 which can send the Tstart signal to trigger the correlation operation timely. As previously stated, for coherent correlation of 1 s, the local carrier signal should be adjusted momentarily by using the Doppler shift and the Doppler shift rate due to the requirement for frequency resolution of 1 Hz.

The tracking module 307 is initiated when the GPS signal is acquired. Different from a conventional tracking module which includes a phase lock loop (PLL) and a delay lock loop (DLL), the tracking module 307 starts only the DLL to track the C/A code phase and the PLL is replaced by a software solution using the Doppler shift and the Doppler shift rate. The accurate receiving time for the GPS signal is obtained from the tracking module 307, and the navigation data has been wiped off during the coherent correlation in the acquisition module 305.

Since no navigation data is obtained from the tracking module 307, the predicted navigation data is sent to a post processing module 309 to obtain satellite orbital position parameters. The post processing module 309 can also be omitted if these satellite orbital position parameters are available in the assistance data.

A position calculation module 311 utilizes the satellite orbital position parameters from the post processing module 309 and the accurate receiving time to calculate the user's position according to the following equation group 2):

$$\begin{cases} \sqrt{(x_0 - x)^2 + (y_0 - y)^2 + (z_i - z)^2} = c \times (X) \\ \sqrt{(x_1 - x)^2 + (y_1 - y)^2 + (z_1 - z)^2} = c \times (X + \Delta T_0) \\ \sqrt{(x_2 - x)^2 + (y_2 - y)^2 + (z_2 - z)^2} = c \times (X + \Delta T_1) \\ \sqrt{(x_3 - x)^2 + (y_3 - y)^2 + (z_3 - z)^2} = c \times (X + \Delta T_2) \end{cases} \quad 2)$$

where (x0, y0, z0), (x1, y1, z1), (x2, y2, z2) and (x3, y3, z3) are position coordinates respectively for four satellites, c is the velocity of light, $\Delta T_0$, $\Delta T_1$ and $\Delta T_2$ are time differences in the accurate receiving time for the GPS signals from the four satellites to the GPS receiver 310, and (x, y, z) and X are unknown values.

Figure 4:
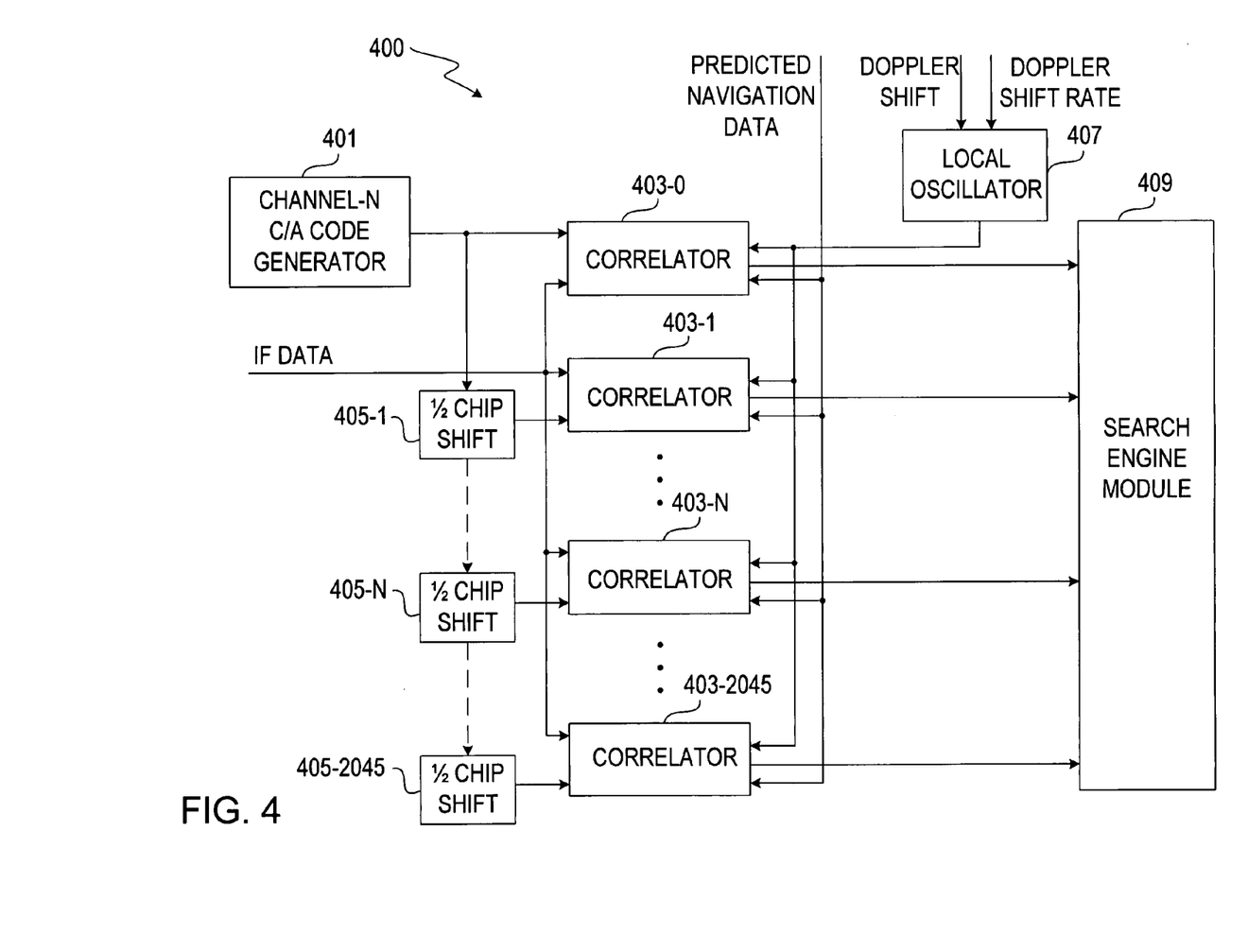
FIG. 4 is a block diagram of an exemplary acquisition module of the GPS receiver in FIG. 3.

FIG. 4 illustrates a block diagram of an exemplary acquisition module 400 of the GPS receiver 310. The acquisition module 400 includes 2046 parallel correlators numbered consecutively from a correlator 403-0 to a correlator 403-2045, a channel-N C/A code generator 401 capable of generating local C/A codes, a local oscillator 407 capable of generating carrier signals, and a search engine module 409. Each correlator completes the correlation taking the IF signal, a local carrier signal, a local C/A code and the predicted navigation as input signals. In the correlator 403-0, the correlation operation consists of multiplying the IF signal with the local carrier signal, the local C/A code and the predicted navigation data to obtain a product, and then integrating the product over one second to obtain a correlation result. The correlation result is then sent to the search engine module 409. The search engine module 409 determines whether the correlation result has exceeded a predefined threshold value and reaches a peak value. In the correlator 403-0, in order to find the code phase of the C/A code in the GPS signal, the local C/A code is shifted by half a chip for each C/A code search. In the correlator 403-1, a similar correlation is performed except that the local C/A code sent to the correlator 403-1 is shifted by half a chip. The ½ chip shift module 405-1 is used to shift the local C/A code by half a chip. As previously stated, a full period of the C/A code contains 1023 chips. Therefore, for the predicted Doppler frequency, 2046 correlations are required to cover the phase search of a full period of the C/A code. If no correlation peak is found on the predicted Doppler frequency, the acquisition module will repeat the aforementioned process on other Doppler frequencies near the predicted Doppler frequency until the correlation peak is found. As illustrated before, during the coherent correlation, the carrier signal generated by the local oscillator 407 should be adjusted momentously by the Doppler shift and the Doppler shift rate to fulfill the requirement of 1 Hz resolution in frequency domain.

Figure 5:
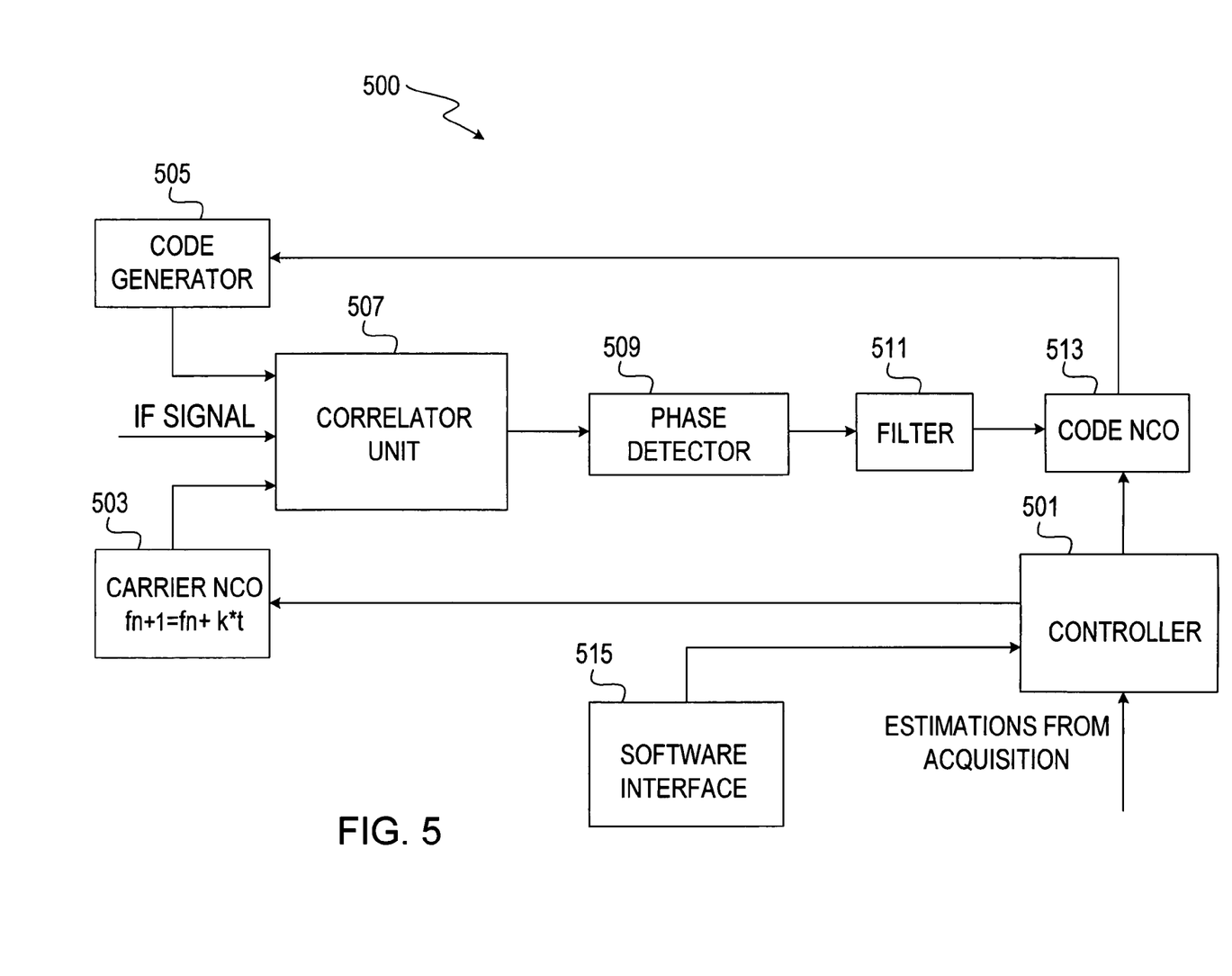
FIG. 5 is a block diagram of an exemplary tracking module of the GPS receiver in FIG. 3.

FIG. 5 illustrates a block diagram of an exemplary tracking module 500 of the GPS receiver 310. When the acquisition process is completed, the tracking process follows the IF signal and adjusts itself to track the C/A code and the Doppler frequency of the IF signal. The tracking module 500 includes a controller 501, a carrier numerically controlled oscillator (NCO) 503 and a DLL formed by a code generator 505, a correlator unit 507, a phase detector 509, a filter 511, a code NCO 513 and a software interface 515. The controller 501 receives outputs from the acquisition module as an initial C/A code phase and Doppler frequency estimation. The code NCO 513 and the code generator 505 generate a local C/A code with a certain rate and an initial code phase, where the rate of the local C/A code is controlled by the code NCO 513 and the initial code phase of the local C/A code is determined by the C/A code phase estimation. The local C/A code is then correlated with the IF signal and a local frequency generated by the carrier NCO 503 in the correlator unit 507. Outputs of the correlator unit 507 are compared by the phase detector 509 and filtered by the filter 511. Based on an output of the filter 511, a control signal can be generated and provided to the code NCO 513 to adjust the rate of the local C/A code until it matches the C/A code in the IF signal.

In the design, it is unnecessary to start the conventional PLL, since a convenient and effective solution can be adopted to track the Doppler frequency by using the Doppler shift and the Doppler shift rate. In the beginning, the controller 501 initiates a frequency of the carrier NCO 503 according to the Doppler frequency estimation. After a short period of time, the Doppler shift and Doppler shift rate are provided to the controller 501 through the software interface 515. The controller 501 controls the carrier NCO 503 to adjust the frequency momentously according to the equation 1) until the local frequency matches the Doppler frequency of the carrier signal in the IF signal.

Figure 6:
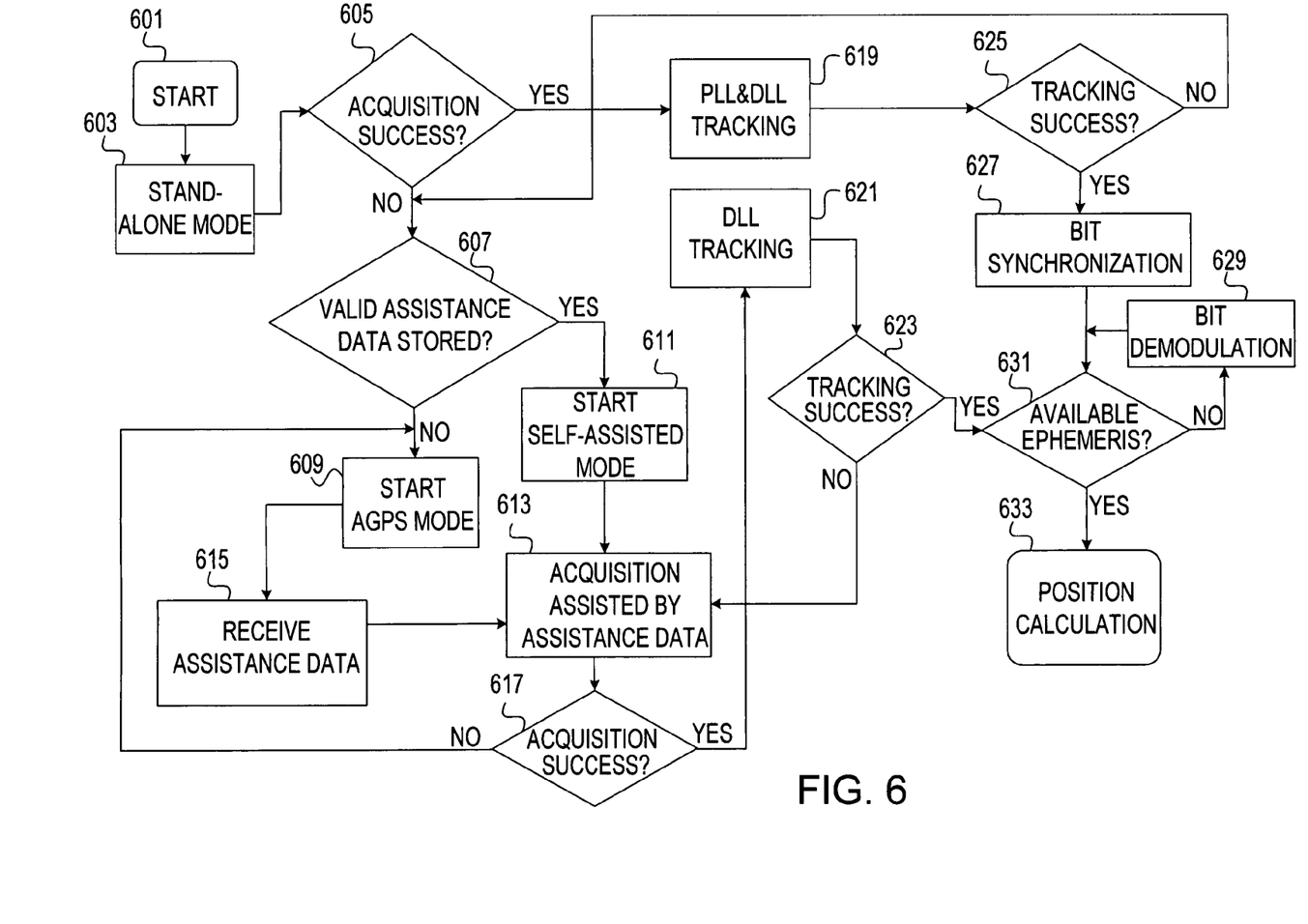
FIG. 6 is a flowchart illustrating operation of a GPS receiver.

FIG. 6 illustrates a flowchart for operation of a GPS receiver. According to different environments, the GPS receiver can work in three modes: the stand-alone mode, the self-assisted mode and the AGPS mode. When the GPS receiver is started in step 601, it is initiated to work in the stand-alone mode as illustrated in step 603. The GPS receiver will keep in the stand-alone mode, if it has an ideal application environment where after the GPS receiver checks whether the acquisition process is successful, step 605, the GPS receiver shifts to a DLL and PLL tracking in step 619, and after the GPS receiver checks whether the tracking process is successful, step 625, the GPS receiver shifts to a bit synchronization process in step 627. When completing the bit synchronization process, the GPS receiver checks whether ephemeris is available, step 631, if the ephemeris is available, the GPS receiver will shift to calculate the position of the GPS receiver in step 633 directly, if no ephemeris is available, the GPS receiver will shift to a bit demodulation process in step 629 to extract the ephemeris before the position calculation.

If the acquisition process fails in step 605 or the tracking fails in step 625, the GPS receiver will shift to search for valid assistance data in memory in step 607. These valid assistance data include predicted navigation data, Doppler shift and Doppler shift rate which are estimated based on ephemeris, almanac and other satellite information coded in GPS signals acquired within last 2 hours. If the valid assistance data are found in the memory, the GPS receiver shifts from the stand-alone mode to the self-assisted mode in step 611. In the self-assisted mode, the GPS signal is acquired in step 613 by using the assistance data. If the acquisition process succeeds in step 617, the tracking in step 621 starts only the DLL since the Doppler shift and the Doppler shift rate may assist frequency tracking. If the tracking fails in step 623, the GPS receiver restarts the acquisition process in step 613 until the C/A code phase and the Doppler frequency are obtained from the tracking process. Then the GPS receiver checks whether the ephemeris is available, step 631. If the assistance data also contain ephemeris, the GPS receiver will conduct the position calculation in step 633 directly. Otherwise, the GPS receiver will extract the ephemeris from the predicted navigation data in step 629 and then calculate the position of the GPS receiver in step 633.

If no valid assistance data is found in step 607 or the acquisition process fails in step 617, the GPS receiver shifts to the AGPS mode in step 609. In the AGPS mode, the GPS receiver has to resort to an AGPS base station for the most updated assistance data in step 615. When the GPS receiver obtains the most updated assistance data, it will start the acquisition process in step 613 by using these updated assistance data. Then, the GPS receiver checks whether the acquisition process is successful, step 617. If the acquisition process fails, the GPS receiver will shift to step 609 and repeat the aforementioned operation, otherwise the GPS receiver initiates the DLL tracking in step 621. Similarly, after the GPS receiver checks whether the DLL tracking is successful, step 623, if the DLL tracking fails, the GPS receiver will restart the acquisition process in step 613, otherwise the GPS receiver will follow the remaining steps as previously stated in the self-assisted mode to obtain the position of the GPS receiver.

The terms and expressions which have been employed herein are used as terms of description and not of limitation, and there is no intention, in the use of such terms and expressions, of excluding any equivalents of the features shown and described (or portions thereof, and it is recognized that various modifications are possible within the scope of the claims. Other modifications, variations, and alternatives are also possible. Accordingly, the claims are intended to cover all such equivalents.

What is claimed is:

1. A method for processing a global positioning system (GPS) signal at a GPS receiver, comprising the steps of:
    converting the GPS signal to an intermediate frequency signal, wherein the GPS signal being modulated by a carrier signal, a pseudorandom code and a predicted navigation data;
    obtaining the predicted navigation data for the GPS signal;
    generating a local carrier signal and a local pseudorandom code; and
    correlating the intermediate frequency signal with the predicted navigation data, the local carrier signal and the local pseudorandom code at a starting time.

2. The method of claim 1, wherein the predicted navigation data is obtained before the GPS signal is received at the GPS receiver.

3. The method of claim 1, further comprising the step of:
    correcting a real-time clock of the GPS receiver to 1 millisecond accuracy against a GPS time of a satellite, wherein the GPS signal is from the satellite.

4. The method of claim 3, wherein the starting time is controlled by the real-time clock of the GPS receiver.

5. A method for synchronizing a GPS receiver with a satellite, comprising the steps of:
    obtaining assistance data for a GPS signal received from the satellite at a predetermined time, wherein the assistance data including predicted navigation data, Doppler shift and Doppler shift rate and the GPS signal being modulated by a carrier signal, a pseudorandom code and navigation data;
    estimating a predicted receiving time for the GPS signal reaching the GPS receiver;
    capturing the GPS signal through channels of the GPS receiver;
    acquiring the GPS signal at each channel by using the assistance data to obtain a local receiving time for the GPS signal, wherein the GPS signal at each channel has a starting point and a predetermined search period; and
    correcting a real-time clock of the GPS receiver based on the local receiving time and the predicted receiving time.

6. The method of claim 5, wherein the predicted receiving time being based on a starting time of transmission and an estimated transmission time of the GPS signal.

7. The method of claim 6, wherein the starting time of transmission being derived from the predicted navigation data.

8. The method of claim 6, wherein the estimated transmission time being estimated based on a transmission time of the GPS signal from the satellite to an assisted-GPS base station.

9. The method of claim 5, wherein the step of acquiring the GPS signal further comprising the steps of:
    a) converting the GPS signal to an intermediate frequency signal;
    b) generating a local carrier signal and a local pseudorandom code;
    c) aligning the starting point of the GPS signal with the predicted navigation data;
    d) correlating the GPS signal with the predicted navigation data, the local carrier signal and the local pseudorandom code to obtain a correlation result;
    e) repeating step d) for all possible frequencies of the local carrier signal and all possible code phases of the local pseudorandom code to search for a correlation peak from all correlation results;
    f) offsetting the GPS signal a predetermined time interval against the predicted navigation data within the predetermined search period;
    g) repeating the steps from step d) to step f) until the correlation peak is found, wherein when the correlation peak is found, a code phase of the pseudorandom code is identical to the possible code phase of the local pseudorandom code;
    h) tracking the code phase of the pseudorandom code in the GPS signal when the correlation peak is found; and i) obtaining the local receiving time for the GPS signal based on the code phase and an overall time offset of the GPS signal against the predicted navigation data.

10. The method of claim 9, further comprising the step of: adjusting the local carrier signal according to the Doppler shift and the Doppler shift rate.

11. The method of claim 9, further comprising the step of: tracking a Doppler frequency of the carrier signal in the GPS signal according to the Doppler shift and the Doppler shift rate when the correlation peak is found.

12. A method for positioning of a GPS receiver in a weak signal environment, comprising the steps of:
   a) obtaining assistance data for a GPS signal from a satellite at a predetermined time, wherein the assistance data including predicted navigation data, Doppler shift and Doppler shift rate and the GPS signal being modulated by a carrier signal, a pseudorandom code and navigation data;
   b) estimating a predicted receiving time for the GPS signal reaching the GPS receiver;
   c) capturing the GPS signal;
   d) converting the GPS signal to an intermediate frequency signal;
   e) acquiring a code phase of the pseudorandom code from the intermediate frequency signal by using the assistance data and the predicted receiving time; and
   f) obtaining a position for the GPS receiver based on the predicted navigation data and the code phase of the pseudorandom code.

13. The method of claim 12, further comprising the step of: synchronizing the GPS receiver and an assisted-GPS base station with the satellite.

14. The method of claim 13, wherein the step of synchronizing the GPS receiver and the assisted-GPS base station with the satellite further comprising the steps of:
   providing a frame of navigation data from the satellite to the GPS receiver and the assisted-GPS base station;
   recording a first time stamp at the assisted-GPS base station when the frame of navigation data reaches the assisted-GPS base station;
   recording a second time stamp at the GPS receiver when the frame of navigation data reaches the GPS receiver;
   transmitting the frame of navigation data and the first time stamp from the assisted-GPS base station to the GPS receiver;
   correcting a first real-time clock in the assisted-GPS base station based on the frame of navigation data and the first time stamp; and
   correcting a second real-time clock in the GPS receiver based on the frame of navigation data, the first time stamp and the second time stamp.

15. The method of claim 12, wherein the predicted receiving time being based on a starting time of transmission and an estimated transmission time of the GPS signal.

16. The method of claim 15, wherein the starting time of transmission being derived from the predicted navigation data.

17. The method of claim 15, wherein the estimated transmission time being estimated based on a transmission time of the GPS signal from the satellite to the assisted-GPS base station.

18. The method of claim 12, wherein the step of acquiring a code phase of the pseudorandom code further comprising the steps of:
   a) generating a local carrier signal and a local pseudorandom code;
   b) correlating the intermediate frequency signal with the predicted navigation data, the local carrier signal and the local pseudorandom code to obtain a correlation result;
   c) repeating step b) for all possible frequencies of the local carrier signal and all possible code phases of the local pseudorandom code to search for a correlation peak from all correlation results, wherein when the correlation peak is found, a code phase of the pseudorandom code is identical to the possible code phase of the local pseudorandom code; and
   d) tracking the code phase of the pseudorandom code in the GPS signal when the correlation peak is found.

19. The method of claim 18, wherein step b) being firstly performed at a time based on the predicted receiving time.

20. The method of claim 18, further comprising the step of: adjusting the local carrier signal according to the Doppler shift and the Doppler shift rate.

21. The method of claim 18, further comprising the step of: tracking a Doppler frequency of the carrier signal in the GPS signal by using the Doppler shift and the Doppler shift rate when the correlation peak is found.

22. The method of claim 18, wherein the step of obtaining the position for the GPS receiver further comprising the steps of:
   calculating a receiving time for the GPS signal based on the starting time and the code phase of the pseudorandom code;
   decoding satellite parameters from the predicted navigation data; and
   calculating the position for the GPS receiver based on the receiving time and the satellite parameters.

23. A method for controlling a GPS receiver, comprising the steps of:
   initiating the GPS receiver to a stand-alone mode;
   determining whether the GPS receiver succeeded to acquire GPS signals from at least four satellites;
   shifting the GPS receiver to a self-assisted mode if the GPS receiver failed to acquire the GPS signals from the at least four satellites;
   determining whether valid assistance data are stored in memory of the GPS receiver; and
   shifting the GPS receiver to an assisted-GPS mode if no valid assistance data are stored in the memory of the GPS receiver.

24. The method of claim 23, further comprising the step of: positioning the GPS receiver in the self-assisted mode by using the valid assistance data when the valid assistance data are stored in the memory of the GPS receiver.

25. The method of claim 23, further comprising the steps of:
   receiving assistance data from an assisted-GPS base station when no valid assistance data are stored in the memory of the GPS receiver; and
   positioning the GPS receiver in the assisted-GPS mode by using the assistance data.

* * * * *